E. A. LE BEAU.
THIRD SUSPENSION FOR BRAKE BEAMS.
APPLICATION FILED AUG. 19, 1910.
990,889.
Patented May 2, 1911.
2 SHEETS—SHEET 2.
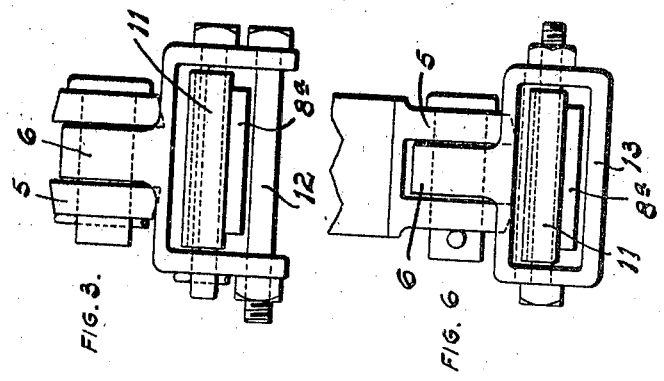
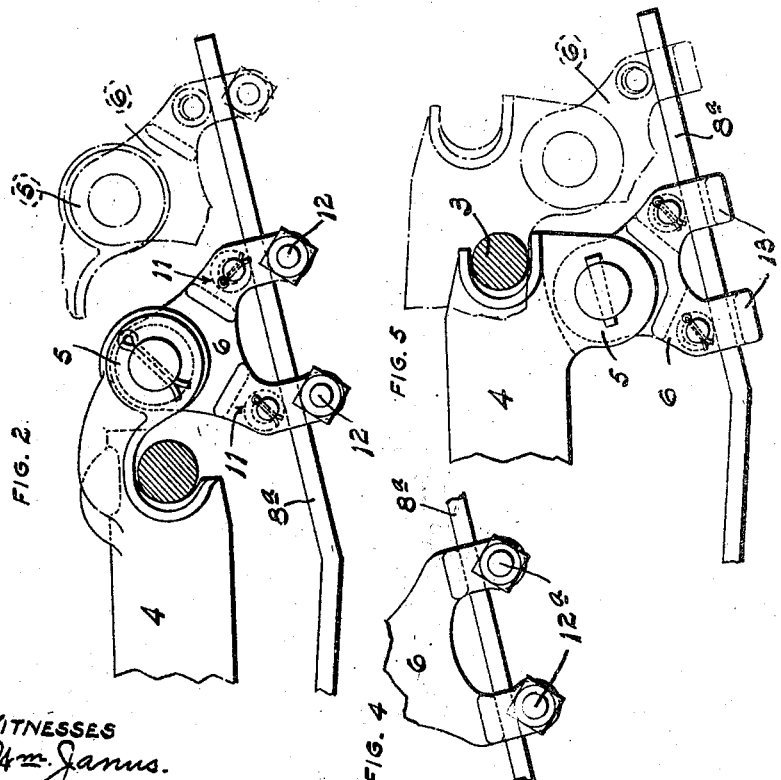
WITNESSES
INVENTOR
ERNEST A. LE BEAU

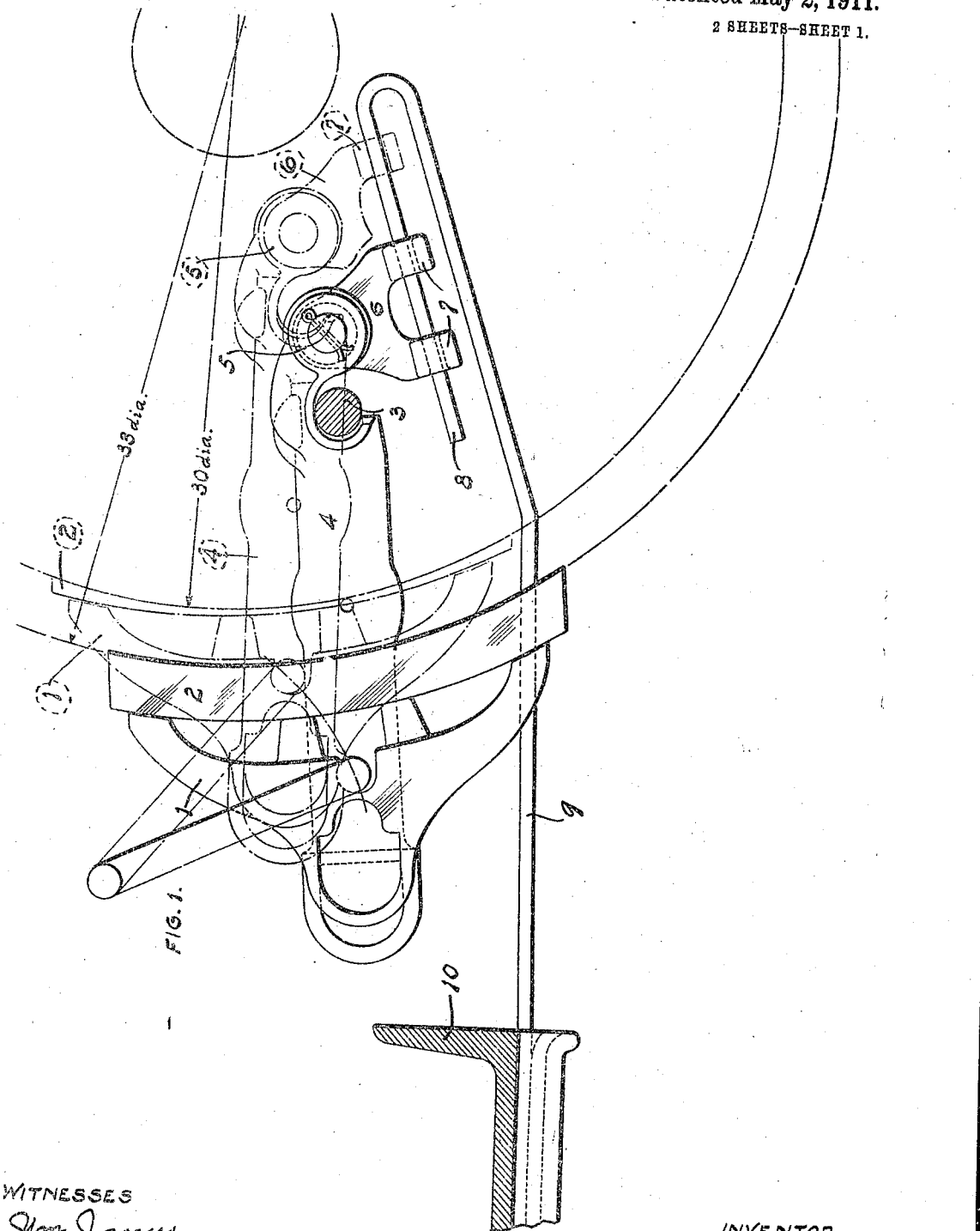

UNITED STATES PATENT OFFICE.

ERNEST A. LE BEAU, OF CHICAGO, ILLINOIS, ASSIGNOR TO CHICAGO RAILWAY EQUIPMENT COMPANY, OF CHICAGO, ILLINOIS, A CORPORATION OF ILLINOIS.

THIRD SUSPENSION FOR BRAKE-BEAMS.

990,889.

Specification of Letters Patent.

Patented May 2, 1911.

Application filed August 19, 1910. Serial No. 577,963.

*To all whom it may concern:*

Be it known that I, ERNEST A. LE BEAU, a citizen of the United States, residing at Chicago, Illinois, have invented a certain new and useful Improvement in Third Suspensions for Brake-Beams, of which the following is a full, clear, and exact description, such as will enable others skilled in the art to which it appertains to make and use the same, reference being had to the accompanying drawings, forming part of this specification, in which—

Figure 1 is a side elevational view of my improved brake beam suspension; Fig. 2 is a similar view of a modified form; Fig. 3 is an end elevational view of the structure shown in Fig. 2; Fig. 4 is a detail view of another modified form; Fig. 5 is an elevational view of a modified form; Fig. 6 is an end view of the structure shown in Fig. 5.

This invention relates to new and useful improvements in brake beam suspensions, and particularly what is known as the third suspension support for brake beams. In the present practice, railroads are using forged or rolled steel wheels, which are capable of being turned down in the truing operation so that their diameter is reduced. Ordinarily, these wheels are made thirty three inches in diameter and may be turned down to thirty inches in diameter. This reduction in the diameter of the wheel materially affects the brake beam, and particularly with relation to the suspension spring.

The present invention consists in providing the inner end of the strut of a trussed beam with a carrier, preferably arranged at an obtuse angle to the edges of the strut and having two or more points of support whereby it is maintained in proper relation to the inclined track or third suspension spring, which latter is secured to the spring plank or part of the truck frame.

In the drawings, Fig. 1 shows in full lines the position of the brake beam when used with a new shoe on a wheel thirty three inches in diameter, and in dotted lines the position of said beam and hanger when shoe is worn and the diameter of the wheel reduced to thirty inches. This drawing clearly illustrates how the beam is not only thrown forward but upward by the reduced diameter of the wheel and the wearing of the shoe, the brake shoe being thus properly applied to the wheel in all gradations of this wearing and wheel reduction. The carrier forming the supporting element for the inner end of the strut is preferably made separate from the strut, although it may be cast integral therewith. By being made separately, it can be made for holding the center beam without change in the strut casting. The double legs of this carrier insure the free sliding movement of the same without danger of wedging or binding.

In the drawings, 1 indicates the head of a brake beam and 2 the shoe thereof.

3 is the tension member and 4 the strut, which latter is provided with a nose or extension 5 of any desired form for the third suspension arrangement. In this nose or extension is mounted a carrier 6 having legs or supports 7 provided with suitable openings, through which the inclined track 8 of the third suspension spring passes.

In Fig. 6 the inclined track may be refolded, as shown. The main leg of the third suspension spring 9 is secured to the spring plank 10 or other suitable part of the truck frame.

In Fig. 2 I have shown the same arrangement, with the exception that the inclined portion 8ª of the third suspension spring is not refolded and the bearing 11 in the supporting legs of the carrier is in the form of a hollow cylinder or roller for the purpose of reducing friction. Bolts 12 or other removable fastening devices are employed for holding the carrier in position. To remove the carrier, it is only necessary to take out the bolts and lift the carrier, or the pivot bolt which pivotally secured the carrier to the beam, may be removed.

In Fig. 4 I have shown integral bearing surfaces in the legs, and removable bolts 12ª under the same, these removable bolts being used for the same purpose as bolts 12 before described.

In Fig. 5, the under side of the legs is provided with integral cross-members 13 in lieu of the removable bolts 12, and anti-friction rollers are also used to coöperate with the upper surface of the third suspension spring. In this form the nose of the strut is not extended forward and over the tension member, but is arranged under said tension member.

What I claim is:

1. In a third suspension for brake beams, the combination of a suspension spring having an inclined portion, and a carrier having a plurality of supporting points coöperating with said inclined portion.

2. In a third suspension for brake beams, the combination of a supporting member having an inclined portion, a carrier having a plurality of supporting surfaces coöperating with said supporting member, and a brake beam to which said carrier is connected.

3. In a third suspension for brake beams, the combination of a brake beam, a carrier connected thereto and having a plurality of depending legs, a supporting member arranged between said legs, and a plurality of supporting surfaces for coöperating with said supporting member.

4. In a third suspension for brake beams, the combination of a brake beam having a brake lever post, of a third suspension carrier connected to the inner end of said post and having a plurality of supporting surfaces whereby it is maintained in proper relation to its supporting member, and a supporting member for said carrier.

5. In a third suspension for brake beams, the combination of a carrier connected to the beam, a supporting member and anti-friction devices arranged in said carrier and coöperating with said supporting member.

6. In a third suspension for brake beams, the combination of a brake beam having a brake lever post, of a carrier arranged at an angle to the elongated axis of said post, a supporting member, and a plurality of supporting surfaces in said carrier for coöperating with said supporting member.

7. A carrier for brake beams, comprising a casting having means for connection with the brake beam, and a plurality of depending legs for coöperating with the supporting member.

8. A carrier for brake beams, comprising a casting having means for connection with the brake beam, a plurality of depending legs and removable bearing surfaces carried by said legs for coöperating with the supporting member.

9. A carrier for brake beams, comprising a casting having a plurality of depending legs, and anti-friction devices arranged between said legs for coöperating with the supporting member.

10. A carrier for brake beams, comprising a casting having depending legs, bearing surfaces arranged between said legs for coöperating with a supporting member, and removable devices carried by said legs and arranged under the supporting member.

11. A carrier for brake beams, comprising a casting having depending legs, anti-friction devices arranged between said legs for coöperating with the upper surface of a supporting member, and removable devices mounted in said legs and arranged under said supporting member.

In testimony whereof I hereunto affix my signature in the presence of two witnesses, this 15th day of August, 1910.

ERNEST A. LE BEAU.

Witnesses:
 E. T. WALKER,
 M. F. HUNTOON.